(12) United States Patent
Kim et al.

(10) Patent No.: US 11,364,658 B2
(45) Date of Patent: Jun. 21, 2022

(54) PROGRAMMABLE SOFT MATERIALS CONTAINING FERROMAGNETIC DOMAINS AND METHODS OF MAKING

(71) Applicant: Massachusetts Institute of Technology, Cambridge, MA (US)

(72) Inventors: Yoonho Kim, Cambridge, MA (US); Xuanhe Zhao, Allston, MA (US); Hyunwoo Yuk, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 402 days.

(21) Appl. No.: 16/374,267

(22) Filed: Apr. 3, 2019

(65) Prior Publication Data

US 2020/0223099 A1     Jul. 16, 2020

Related U.S. Application Data

(60) Provisional application No. 62/651,992, filed on Apr. 3, 2018.

(51) Int. Cl.
| | |
|---|---|
| B29B 11/00 | (2006.01) |
| H01F 7/00 | (2006.01) |
| H01F 13/00 | (2006.01) |
| B29B 11/10 | (2006.01) |
| H01F 7/04 | (2006.01) |
| B33Y 10/00 | (2015.01) |
| B33Y 70/10 | (2020.01) |

(52) U.S. Cl.
CPC .............. *B29B 11/10* (2013.01); *H01F 7/04* (2013.01); *H01F 13/003* (2013.01); *B33Y 10/00* (2014.12); *B33Y 70/10* (2020.01)

(58) Field of Classification Search
CPC . B29B 11/00; B29B 11/10; H01F 7/00; H01F 7/04; H01F 13/00; H01F 13/003
See application file for complete search history.

(56) References Cited

U.S. PATENT DOCUMENTS

| | | | |
|---|---|---|---|
| 7,615,206 B2 | 11/2009 | Sandhage et al. | |
| 8,968,625 B2 | 3/2015 | Tan | |
| 9,045,657 B2 * | 6/2015 | Lewis | C09D 11/16 |
| 9,138,981 B1 | 9/2015 | Hirsch et al. | |

(Continued)

OTHER PUBLICATIONS

Kim et al.; "Printing ferromagnetic domains for untethered fast—transforming soft materials"; Nature | vol. 558 | Jun. 14, 2018.

(Continued)

*Primary Examiner* — Jacob T Minskey
*Assistant Examiner* — Matthew Hoover
(74) *Attorney, Agent, or Firm* — Peter A. Nieves; Sheehan Phinney Bass & Green PA

(57) ABSTRACT

A responsive material having an elastomeric matrix in which ferromagnetic particles are dispersed so as to have a predetermined magnetization pattern which, when exposed to an external magnetic field, changes the shape of the responsive material from an initial shape to a predetermined transformed shape dictated by the magnetization pattern. An initial shape of the responsive material is formed by direct ink printing while applying magnetic fields to a dispensing nozzle to align the particles and gives rise to the desired magnetization pattern.

12 Claims, 8 Drawing Sheets

(56) References Cited

U.S. PATENT DOCUMENTS

| | | |
|---|---|---|
| 9,360,757 B2 | 6/2016 | DeSimone et al. |
| 9,527,992 B2 | 12/2016 | Shulga et al. |
| 9,676,963 B2 | 6/2017 | Rolland et al. |
| 9,708,451 B2 * | 7/2017 | Lewicki .................. C08K 5/56 |
| 2014/0053311 A1 | 2/2014 | Nordstrom et al. |
| 2014/0225694 A1 | 8/2014 | Sitti et al. |
| 2015/0283759 A1 | 10/2015 | Goredema et al. |
| 2015/0298393 A1 | 10/2015 | Suarez |
| 2016/0207111 A1 | 7/2016 | Robrecht et al. |
| 2016/0257036 A1 | 9/2016 | Fang et al. |
| 2016/0297104 A1 | 10/2016 | Guillemette et al. |
| 2016/0318255 A1 | 11/2016 | Ou et al. |
| 2017/0001377 A1 | 1/2017 | Meisner et al. |
| 2017/0015059 A1 | 1/2017 | Lewicki |
| 2017/0081534 A1 | 3/2017 | Shah et al. |
| 2017/0120528 A1 | 5/2017 | Palacios et al. |
| 2017/0182553 A1 | 6/2017 | Vader et al. |
| 2017/0203515 A1 * | 7/2017 | Bennett .................. G05B 15/02 |
| 2017/0209622 A1 | 7/2017 | Shah et al. |

OTHER PUBLICATIONS

Kokkinis, et al.; "Multimaterial Magnetically Assisted 3D Printing of Composite Materials"; Nature Communications Oct. 2015.
International Search Report for PCT/US19/25575, dated Jul. 5, 2019.

* cited by examiner

Axis of Symmetry

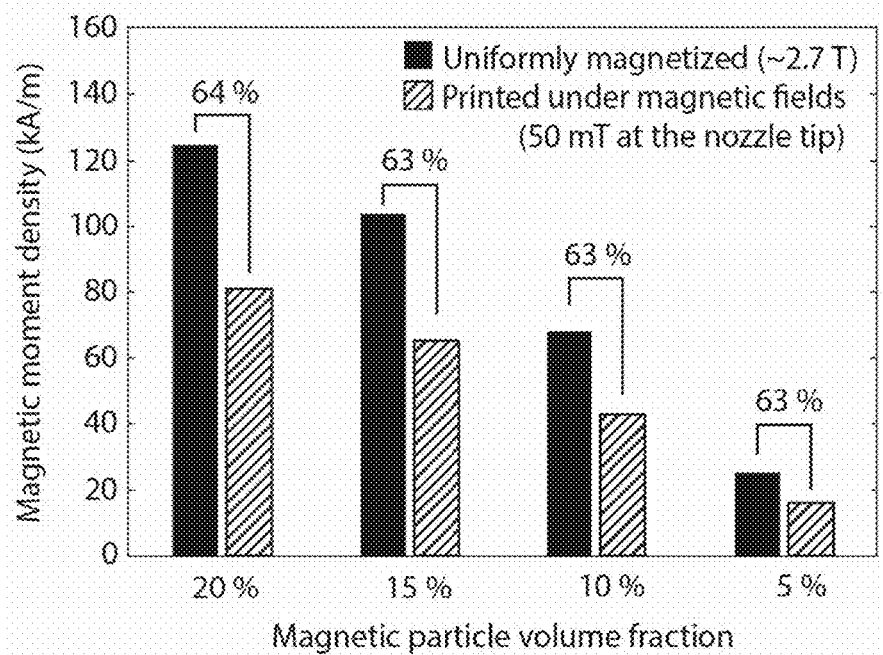

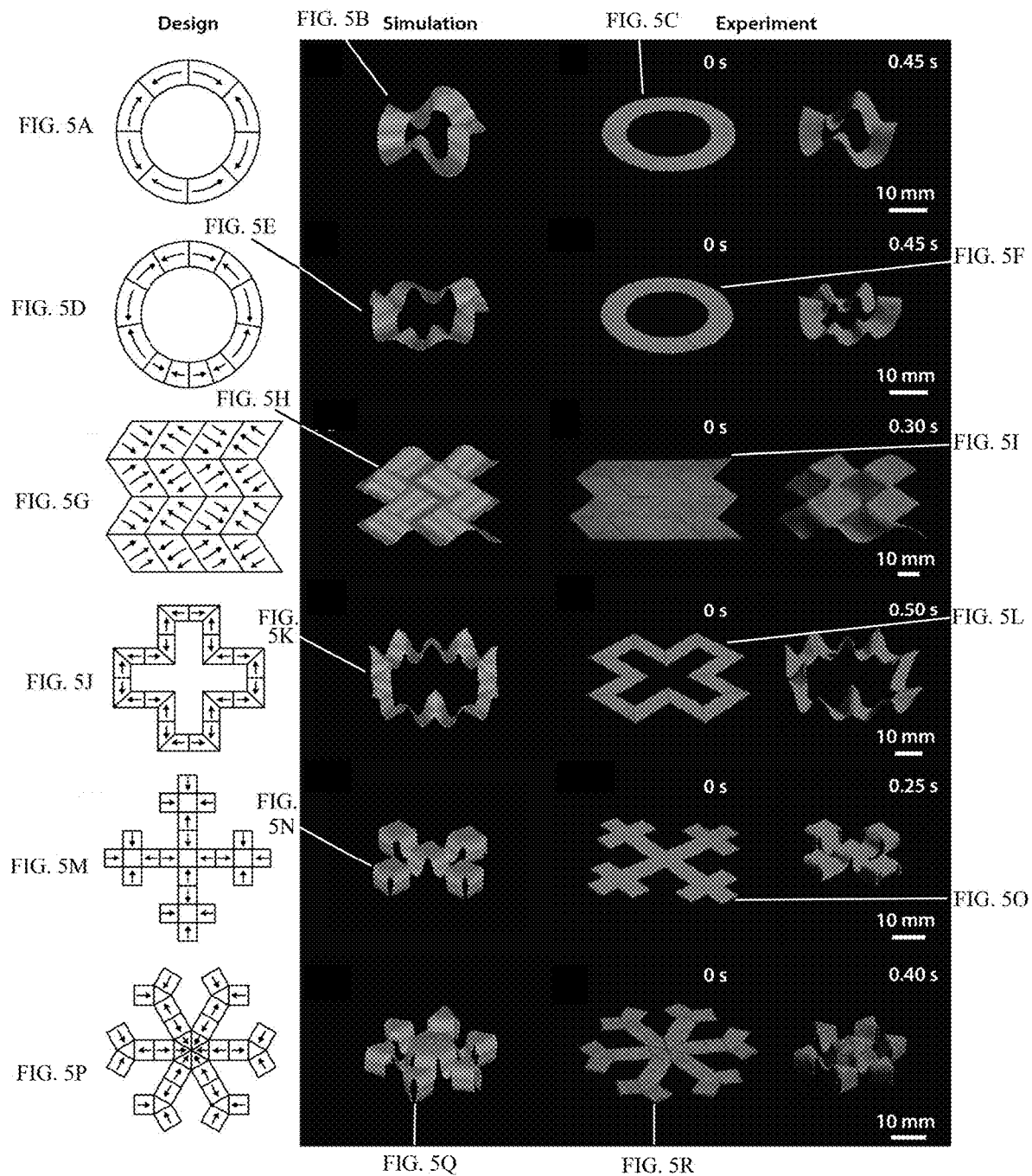

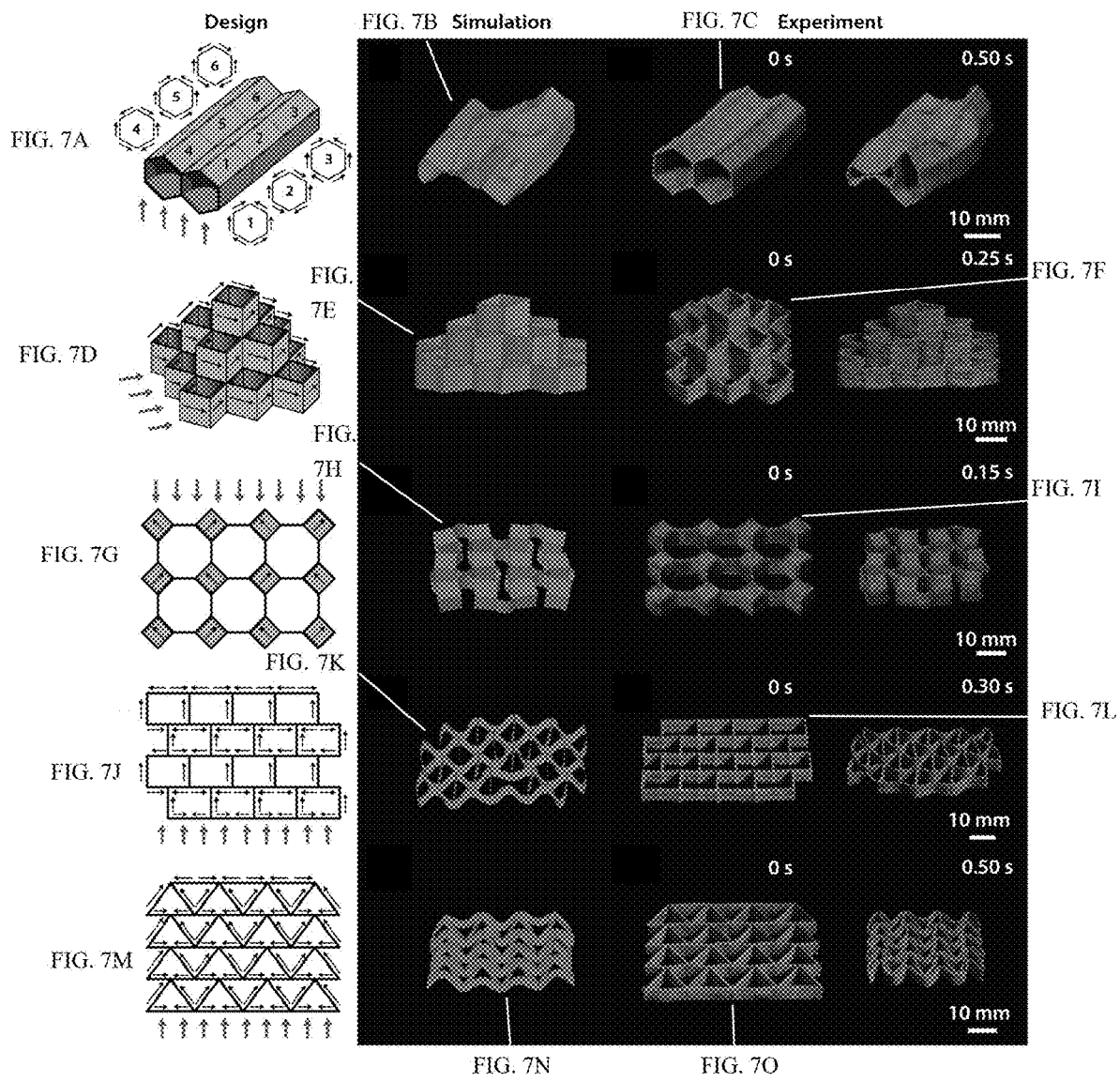

PROGRAMMABLE SOFT MATERIALS CONTAINING FERROMAGNETIC DOMAINS AND METHODS OF MAKING

CROSS-REFERENCE TO RELATED APPLICATIONS

This application claims priority to U.S. provisional application No. 62/651,992, filed on Apr. 3, 2018, and entitled PROGRAMMABLE SOFT MATERIALS CONTAINING FERROMAGNETIC DOMAINS AND METHODS OF MAKING, the contents of which are incorporated herein by reference.

STATEMENT REGARDING FEDERALLY SPONSORED RESEARCH OR DEVELOPMENT

This invention was made with Government support under Grant No. N00014-17-1-2920 awarded by the Office of Naval Research, and Grant No. CMMI-1661627 awarded by the National Science Foundation. The Government has certain rights in the invention.

FIELD OF THE INVENTION

An embodiment of the present invention relates to responsive materials that quickly transform into programmed shapes in the presence of magnetic fields and methods of formation. More particularly, an embodiment of the present invention relates to an elastomeric-ferromagnetic responsive material comprising an elastomeric material having ferromagnetic particles dispersed therein with a predetermined magnetization pattern. Exposure of the elastomeric-ferromagnetic responsive material to a magnetic field changes the shape of the responsive material into a predetermined shape.

BACKGROUND OF THE INVENTION

Shape-programmable soft materials capable of transforming in response to external stimuli have attracted great attention due to their potential applications in areas as diverse as electronic devices, soft robotics, drug or cell delivery, and tissue engineering. Although the exact mechanisms of actuation vary, stimuli to which such materials respond include light, heat, solvents, electric and magnetic fields. Due to the multitude of potential applications, it would be desirable to provide improved shape programmable materials and methods of formation.

BRIEF SUMMARY OF THE INVENTION

According to one aspect, an embodiment of the present invention provides a method that includes forming an elastomeric-ferromagnetic composite material by dispersing one or more ferromagnetic particles within an elastomeric material, printing of the elastomeric-ferromagnetic composite material into an initial shape of a surface, applying a magnetic field to the elastomeric-ferromagnetic composite material during printing to provide the one or more ferromagnetic particles in a predetermined magnetization pattern within the initial shape, curing the printed elastomeric-ferromagnetic composite material in the initial shape, and applying a magnetic field to the cured printed elastomeric-ferromagnetic composite material to transform the initial shape to a predetermined shape of the surface, the predetermined shape being different than the initial shape, wherein the predetermined shape depends upon the predetermined magnetization pattern. An embodiment of the present invention, thus, produces ferromagnetic domains in complex 3D-printed structures, which, after curing, exhibit dynamic response of fast and reversible transformation between complex programmed shapes upon application of external magnetic fields.

Other systems, methods and features of the embodiments of the present invention will be or become apparent to one having ordinary skill in the art upon examining the following drawings and detailed description. It is intended that all such additional systems, methods, and features be included in this description, be within the scope of the embodiments of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the embodiments of the present invention. The drawings illustrate embodiments of the invention and, together with the description, serve to explain the principles of the invention.

FIG. 4 graphically illustrates magnetic moment density compared to magnetic particle volume fraction.

FIGS. 5A-R schematically depict embodiments of various single-layered structures encoded with different ferromagnetic domains which yield complex 3D morphologies upon application of external magnetic fields according to embodiments of the present invention.

FIGS. 7A-O schematically depict embodiments of various multilayer structures encoded with different ferromagnetic domains which yield a complex shape change upon application of external magnetic fields according to embodiments of the present invention.

DETAILED DESCRIPTION

Figure 1A:
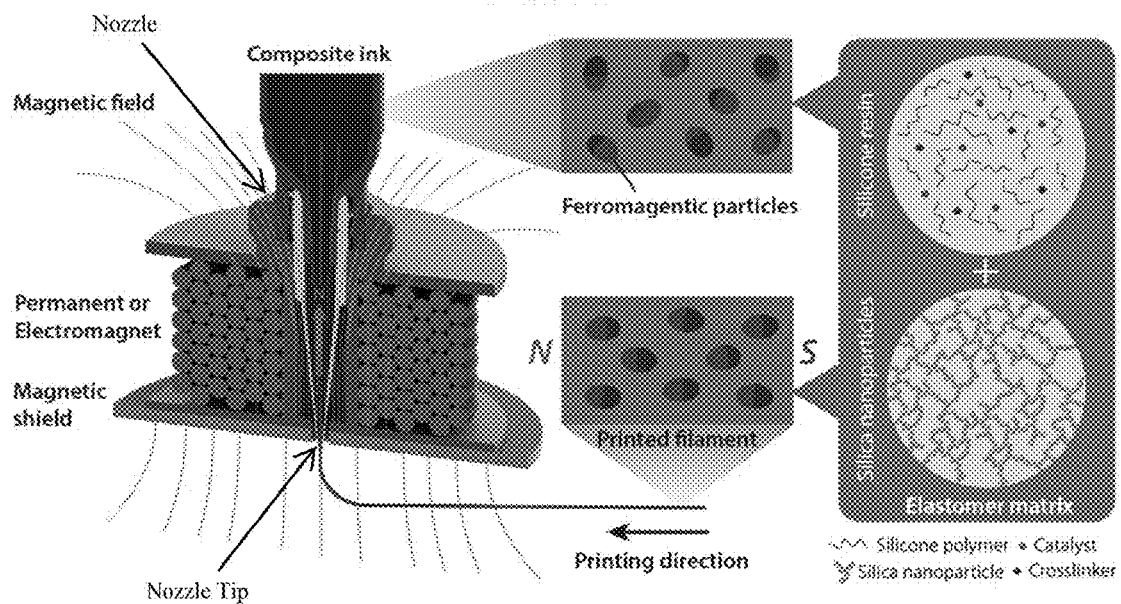
FIG. 1A schematically illustrates application of a magnetic field on a dispensing nozzle (shown as "Nozzle" having a "Nozzle tip") during ink printing to align ferromagnetic particles along a printing direction and give rise to overall magnetic polarity in a printed filament according to an embodiment of the present invention.

The following definitions are useful for interpreting terms applied to features of the embodiments disclosed herein, and are meant only to define elements within the disclosure.

As used herein, the terms:
1) Direct ink writing—Printing ink materials that possess shear yield stresses on the substrate or the uppermost layer of deposited inks to construct 3D structures by pressurizing the ink through nozzles which move along a predefined path.
2) Magnetic ink—Homogeneous mixture of an uncured elastomeric matrix and magnetic microparticles.
3) Curing—Process of crosslinking elastomer matrix into an elastic solid either by heat, UV, or chemical reaction, for example.
4) Ferromagnetic domain—A region within the printed structure that is characterized by the same direction of magnetic polarities that results from the alignment of the embedded ferromagnetic particles formed during the printing process due to the applied magnetic field.

An embodiment of the present invention generally provides an elastomeric-ferromagnetic composite material that transforms into programmed shapes in the presence of magnetic fields. The elastomeric-ferromagnetic composite is formed into a desired initial shape using direct ink writing of the composite, particularly by using ferromagnetic three-dimensional (3D) printing. The printing is carried out in the presence of magnetic fields to provide ferromagnetic particles disposed in a predetermined pattern, which gives rise to overall magnetic polarity in a printed material. Exposure of the thus formed printed material to a magnetic field transforms the initial shape into a programmed shape which is dictated by the pattern and distribution of ferromagnetic particles within the elastomer. Thus, an embodiment of the present invention provides for the formation of ferromagnetic domains in complex 3D-printed structures, which, after curing, exhibit dynamic response of fast transforming between the programmed shapes upon application of external magnetic fields.

According to an embodiment of the invention, the elastomeric-ferromagnetic composite material is a printable ink. The composite material is in the general form of an elastomeric matrix material with ferromagnetic material and any additional fillers, catalysts and crosslinkers preferred for the formation of the present responsive material dispersed within the elastomeric matrix material. For printability, it is beneficial for the ferromagnetic materials to be uniformly dispersed. If the particles agglomerate to form large clusters, the printer nozzle would be easily clogged. Since the ferromagnetic domains can be designed and printed in a way that some regions are magnetically active while some are inactive (this can be done by canceling out the net magnetic moment by alternating the printing direction), it would not be that beneficial to have concentrated particles in certain areas, although it is possible. The elastomeric portion of the composite material can be selected from any conventional elastomers, including, but not limited to silicone rubber.

Possible elastomer types include, but are not limited to, the following:
1. Silicone ("Polydimethylsiloxane" also known as PDMS) rubbers
2. Polyurethane (PU) rubbers
3. Styrene Ethylene Butylene Styrene (SEBS) rubbers
4. Polyacrylate rubbers
5. Polycaprolactone (PCL)

FIG. 1A schematically illustrates application of a magnetic field on a dispensing nozzle (shown as "Nozzle" having a "Nozzle tip") during ink printing to align ferromagnetic particles along a printing direction and give rise to overall magnetic polarity in a printed filament according to an embodiment of the present invention. Composite ink may be input to a nozzle, magnetic field may be induced by a permanent or electromagnet in vicinity of the nozzle, such as surrounding the nozzle. The permanent or electromagnet may be covered by a magnetic shield, as shown, one each at the top and the bottom of the permanent or electromagnet. The magnetic shield at the bottom may include a nozzle tip that contributes to a formation of a printed filament. The block at the right schematically shows a same composition at the input of the nozzle and an output at the nozzle tip. The difference is that at the input, the ferromagnetic particles are randomly oriented, whereas the particles are oriented in a controlled or orderly manner (N/S orientation) in the printed filament, shown schematically in the blocks in the middle of FIG. 1A. It may be noteworthy that the ferromagnetic particles may be included in an elastomer matrix at the input to the nozzle as well as in the printed filament.

The basic requirements for such elastomeric materials include i) that the glass transition temperature is lower than the operating temperature (e.g., room temperature or body temperature) to ensure that the materials are in a rubbery state at the operating temperature and ii) that the materials are soft, exhibiting low Young's modulus, e.g. below 10 MPa.

Hydrogels, instead of elastomers, can also be used, such as alginate, pectin, polyvinyl alcohol (PVA), etc. Hydrogels are composed of polymer matrices filled with water. This wet environment requires that the oxidation of magnetic particles is avoided by using epoxy-coated or corrosion-resistant magnetic particles. Corrosion resistance may be accomplished by epoxy coating as well as by a choice of materials, one being cobalt, for example FIG. 1H illustrates a cross-section of an epoxy coating on a ferromagnetic particle. Also, rheological modifiers with hydrophilicity, such as cellulose nanofibrils, may be used instead of fumed silica nanoparticles. Or, the strong magnetic interaction between the ferromagnetic particles itself can give rheological modification (yield stress behavior) required for the printability of such hydrogel-based ink materials.

Generally, elastomers include multiple components, with a polymeric material forming a main component. In addition to the polymeric material, one or more additional components may be included, such as reinforcing fillers to provide strength, plasticizers to provide any necessary temperature properties, antioxidants, crosslinkers, curing agents, accelerators, etc.

The ferromagnetic portion of the composite material may be selected from any conventional ferromagnetic material, including, but not limited to iron, cobalt, nickel, and alloys or compounds containing one or more of these elements. The ferromagnetic portion is preferably in the form of microparticles to provide the desired complex and intricate magnetization patterns, however, when the particle size becomes greater, fine nozzles cannot be used for printing because of clogging. Particles with an average size of 5 μm allowed printing using a nozzle with diameter greater than or equal to 5 μm. Magnetic nanoparticles (tens or hundreds of nanometer) may also be used, but such small particles in general have lower magnetic strengths in terms of both residual induction and coercivity (resistance against demagnetizing fields) when magnetized up to saturation. Generally speaking, ferromagnetic particles within the range from tens of nanometer to tens of micrometer would be possible to use. Exemplary ferromagnetic materials include magnetizable microparticles of neodymium-iron-boron (NdFeB) alloy and combinations thereof.

Possible magnetic materials may include:
1. Neodymium-Iron-Boron (NdFeB)
2. Samarium-Cobalt (SmCo)
3. Aluminum-Nickel-Cobalt (AlNiCo)
4. Barium-Iron Oxide (BaFeO)
5. Iron Oxide (FeO)

According to embodiments of the invention, in addition to the above-described components, the elastomeric-ferromagnetic composite may further contain one or more fillers. Any conventional fillers may be used, with some exemplary fillers including colorants and fumed silica nanoparticles. Fillers such as fumed silica nanoparticles are included to modify rheological properties of the ink material. The use of such rheological modifiers introduces some preferred properties such as shear thinning and shear yield stress flow behavior, which are required for ink materials to be printable. For example, if the ink material does not have shear yield stress, the deposited ink cannot maintain its cylindrical shape after being extruded out of a nozzle. (Extruded toothpaste, for example, can maintain the cylindrical shape because it does have the shear yield stress. When shear stress is applied (e.g. squeezing), however, it becomes thin and can be extruded out of the tube.)

Types of such rheological modifiers include:
1. Fumed silica nanoparticles
2. Graphene
3. Nanoclay
4. Cellulose nanofibrils In an exemplary embodiment, an elastomeric-ferromagnetic composite ink consists of magnetizable microparticles of neodymium-iron-boron (NdFeB) alloy and fumed silica nanoparticles embedded in a silicone rubber matrix containing a silicone catalyst and suitable crosslinker (e.g. as depicted in FIG. 1A).

A transformable material may include an elastomeric material (elastomer matrix, FIG. 1A), ferromagnetic particles (FIG. 1A) dispersed within the elastomeric material (elastomer matrix, FIG. 1A) to provide an elastomeric-ferromagnetic composite material; the elastomeric-ferromagnetic composite material having an initial shape (FIG. 5C, for example, at 0 second); and the ferromagnetic particles being provided within the initial shape in a predetermined magnetization pattern (FIG. 5A, for example), wherein the transformable material changes shape from the initial shape (FIG. 5C, for example, at 0 second) into a predetermined transformed shape (FIG. 5C, for example, at 0.45 second) different than the initial shape upon application of a magnetic field, and wherein the predetermined transformed shape (FIG. 5C, for example, at 0.45 second) depends upon the predetermined magnetization pattern (FIG. 5A, for example).

In the transformable material, the elastomeric-ferromagnetic composite material may be a printable ink.

In the transformable material, the elastomeric-ferromagnetic composite material may be an elastomeric matrix material including a ferromagnetic material and one or more of a filler, a catalyst, and a crosslinker.

In the transformable material, the elastomeric material may include Silicone (Polydimethylsiloxane) rubber, Polyurethane (PU) rubber, Styrene Ethylene Butylene Styrene (SEBS) rubber, Polyacrylate rubber, and Polycaprolactone (PCL).

In the transformable material, the elastomeric material may have a glass transition temperature lower than an operating temperature. In the transformable material, the elastomeric material may have a Young's modulus below 10 MPa.

In the transformable material, the elastomeric material may be a hydrogel. In the transformable material, the hydrogel may include one or more of alginate, pectin, and polyvinyl alcohol (PVA).

In the transformable material, the ferromagnetic particles may include an epoxy coating. In the transformable material, the ferromagnetic particles may be corrosion-resistant. The ferromagnetic particles may include iron, cobalt, nickel, an alloy of one or more of iron, cobalt, and nickel, Neodymium-Iron-Boron (NdFeB), Samarium-Cobalt (SmCo), Aluminum-Nickel-Cobalt (AlNiCo), Barium-Iron Oxide (BaFeO), and Iron Oxide (FeO).

In the transformable material, the elastomeric material may include a rheological modifier, the rheological modifier being one or more of fumed silica nanoparticles, graphene, nanoclay, and cellulose nanofibrils.

Figure 2A:
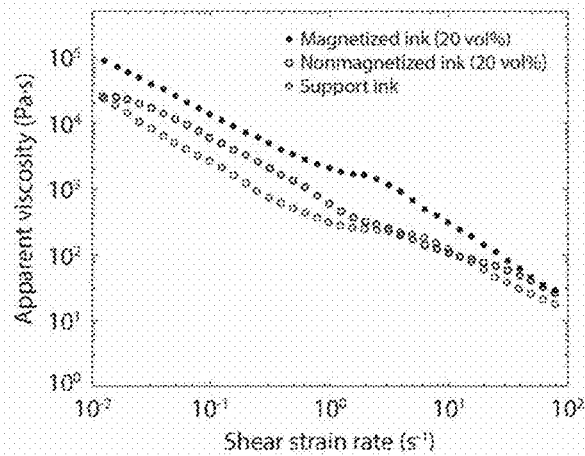
FIGS. 2A-B graphically depict shear-thinning behavior and shear yield stress, respectively, required for direct ink writing of a composite ink, according to an embodiment of the present invention.
Figure 2B:
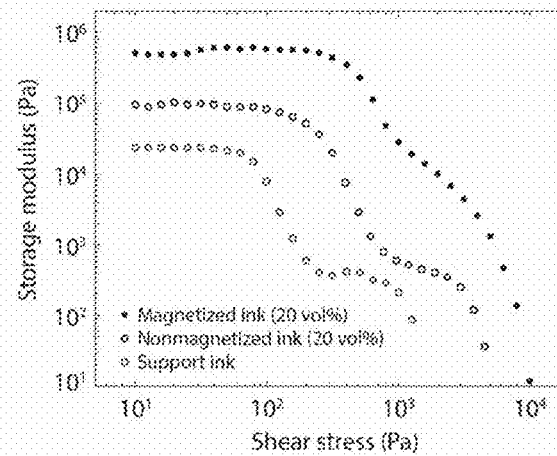

The fumed silica fillers within the silicone material serve as a rheological modifier to induce viscoelastic properties required for direct ink writing, such as shear-thinning behavior (e.g., see FIG. 2A) and a shear yield stress (e.g., see FIG. 2B). FIG. 2A shows apparent viscosity on Y-axis and shear strain rate on X-axis. FIG. 2B shows storage modulus on Y-axis and shear stress on X-axis. FIG. 2A and FIG. 2B each includes plots for magnetized ink (20 vol %), nonmagnetized ink (20 vol %), and support ink. These properties ensure that the deposited inks maintain their deposited shapes, even when printed filaments are stacked up in a layer-wise sequence to construct a 3D structure. In addition, the equilibrium shear yield stress at rest helps the aligned particles to remain unaffected by thermal randomization during the curing process.

An embodiment of the present invention further provides methods of forming the elastomeric-ferromagnetic composite material into a responsive material structure having an initial shape. According to embodiments of the invention, the components of the elastomeric-ferromagnetic composite ink are first mixed, and are subsequently magnetized during formation of the initial shape to provide the desired magnetization pattern which will dictate the transformed shape. This formation is carried out by direct ink printing, particularly ferromagnetic 3D printing. During the printing process, field-induced alignment of the ferromagnetic component within the elastomeric matrix is carried out, which leads to the overall magnetic moment of a printed structure.

Figure 1B:
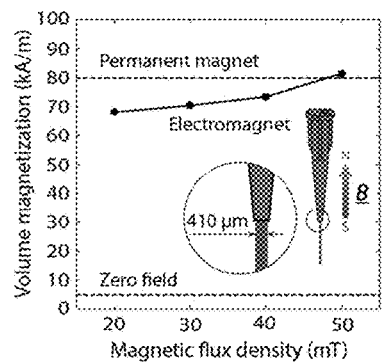
FIG. 1B graphically depicts how quality of alignment is characterized by the volume magnetization versus applied magnetic field strength.
Figure 1C:
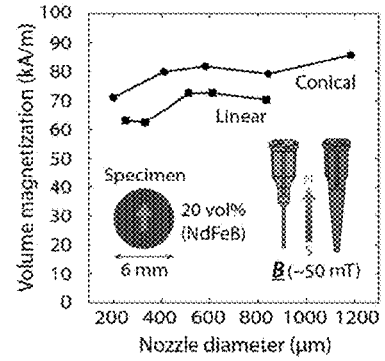
FIG. 1C graphically illustrates a wide range of diameter for both linear and conical nozzles to provide directionality in printed particles.
Figure 1D:
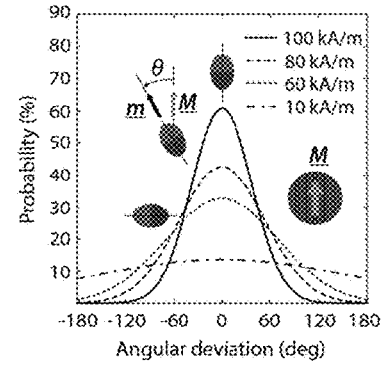
FIG. 1D graphically depicts angular deviation of printed ferromagnetic particles relative to a printing direction under the assumption of Gaussian distributions.

During printing, the quality of alignment of ferromagnetic material is characterized by the volume magnetization (Y-axis) of the cured samples (e.g., samples containing 20 vol % of NdFeB particles) versus the applied magnetic field strength (see FIG. 1B, X-axis). FIG. 1B also shows volume magnetization for a permanent magnet as well as an electromagnet, a zero field level, a view of the nozzle tip, magnetic orientation, a close-up view of the nozzle tip, the printed filament and dimension. The diameter of the nozzle tip is 410 µm which also is the approximate width of the printed filament shown. In a situation where, for example, the diameter of the nozzle tip is less than about 100 µm, the printed filament may be wider than the diameter of the nozzle tip, contributed by a higher pressure applied in a situation of a nozzle tip in that size range. The measured volume magnetization can be translated into the angular deviation of the particles relative to the printing direction under the assumption of Gaussian distributions (see FIG. 1D). FIG. 1D also shows angular deviation, in degrees, of printed ferromagnetic particles relative to a printing direction under the assumption of Gaussian distributions (four plots shown for various levels of volume magnetization in kA/m, probability (%) on Y-axis and angular deviation on X-axis), and angle θ between m and M (orientation of magnetization). In FIG. 1D, M represents overall magnetic orientation (such as printing direction of material), m represents magnetic orientation of an individual magnetic particle. Angle θ between m and M may be influenced by a strength of magnetic field. When printed in the absence of external fields, the samples are magnetically isotropic due to the randomly oriented particles. FIG. 4 shows a comparison. It is a plot of magnetic moment density (Y-axis) versus magnetic particle volume fraction (X-axis). The dark bar indicates a case of maximum achievable magnetization (under a uniform magnetization). The hatched bar indicates how well-aligned the printed filament is (under much weaker magnetic field). According to preferred embodiments, magnetization patterns are carried out using a permanent magnet (PM) or an electromagnet (EM), discussed further below.

Figure 3A:
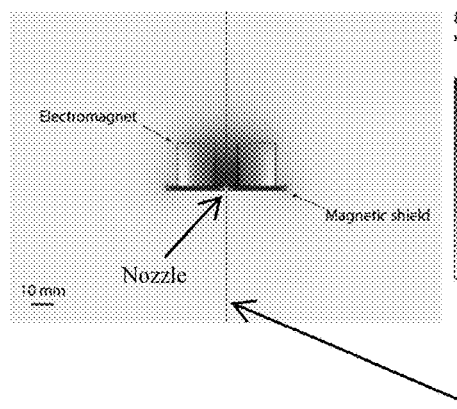
FIGS. 3A-B schematically illustrate examples of positioning a magnetic shield at a printing nozzle tip to attenuate magnetic flux density, according to embodiments of the present invention.
Figure 3B:
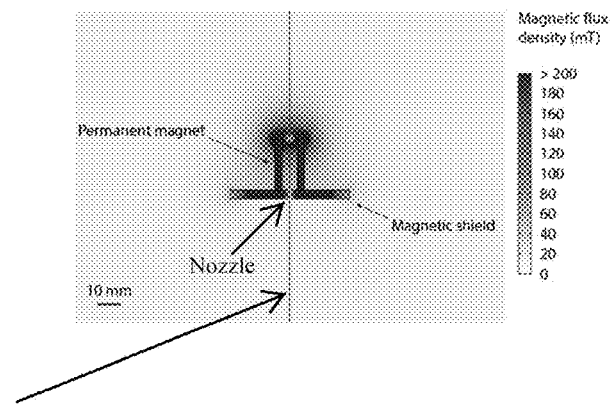

FIG. 3A shows an axis of symmetry, an electromagnet, a nozzle, and a magnetic shield, including an indication of magnetic flux density and a scale of 10 mm. FIG. 3B shows an axis of symmetry, a permanent magnet, a nozzle, and a magnetic shield, including an indication of magnetic flux density and a scale of 10 mm. It is noted that although EM- and PM-induced fields differ in spatial distribution indicated by shaded region in the vicinity of the magnets (see FIGS. 3A-B), the measured volume magnetization becomes comparable if the magnetic flux density around the printing nozzle tip is similar (FIG. 1B). Over a wide range of diameter for both linear and conical nozzles (X-axis, FIG. 1C), which are frequently used in direct ink writing, the measured volume magnetization (Y-axis, FIG. 1C) indicates a clear directionality of particles in the printed samples (FIG. 1C). FIG. 1C also shows examples of a linear nozzle and a conical nozzle and a specimen having NdFeB. The specimen (size=6 mm) is of a composite having an elastomer that may include 20 vol % of NdFeB.

When the printed structures are cured, application of an external magnetic field induces torques on the embedded ferromagnetic particles, which attempt to align themselves with the applied external field. These magnetic torques create internal stresses that collectively lead to a macroscale material response, causing the whole structure to transform into a configuration that minimizes the combined magnetic and elastic energy of the system.

According to an exemplary embodiment, the elastomeric-ferromagnetic composite ink is magnetized with an impulse field over ~2.7 T for saturation of the ferromagnetic particles (e.g., NdFeB ferromagnetic particles). It is noted that each magnetic material will have a different required magnetic field strength to magnetize up to saturation. In this light, the particular number above applies only to the NdFeB microparticles used. For SmCo (Samarium Cobalt), for example, the required field strength is almost double (~5 T).

The magnetic field used to align the particles while printing can be generated using any conventional application of a magnetic field. For example, according to exemplary embodiments, the particles are aligned by either a permanent magnet (PM) or an electromagnet (EM) placed around the ink dispensing nozzle. In the case of an EM-induced magnetic field, the magnetic polarities in the deposited inks can be suitably tuned by switching the direction of the EM-induced field while printing continuously. In the case of a PM-induced magnetic field, the magnetic polarities in the deposited inks can be suitably tuned by changing the printing direction while using unchanging fields induced by the PM. To avoid interference from the applied magnetic field with the aligned particles in the deposited inks, a magnetic shield (e.g., a ferromagnetic steel plate or the like) may further be positioned to attenuate the magnetic flux density after the nozzle tip (e.g. see FIGS. 3A-B).

Figure 1E:
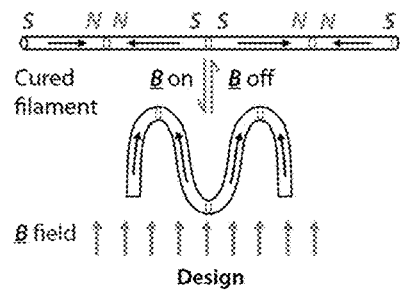
FIG. 1E schematically illustrates a single continuous line printed with an alternating magnetization profile which transforms into a desired "m" shape upon application of external magnetic fields according to an embodiment of the present invention.
Figure 1F:
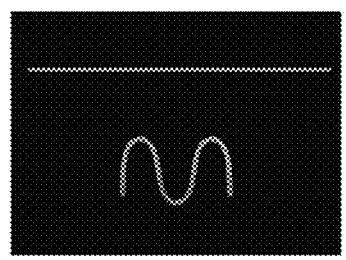
FIG. 1F illustrates a simulation result for the line segment of FIG. 1E.
Figure 1G:
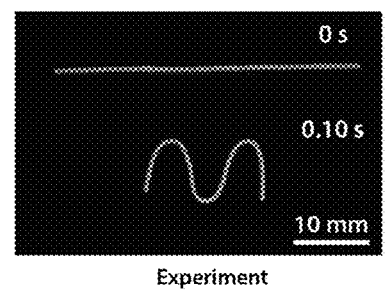
FIG. 1G illustrates an experimental result of applying a magnetic field to the line segment of FIG. 1E.
Figure 1H:
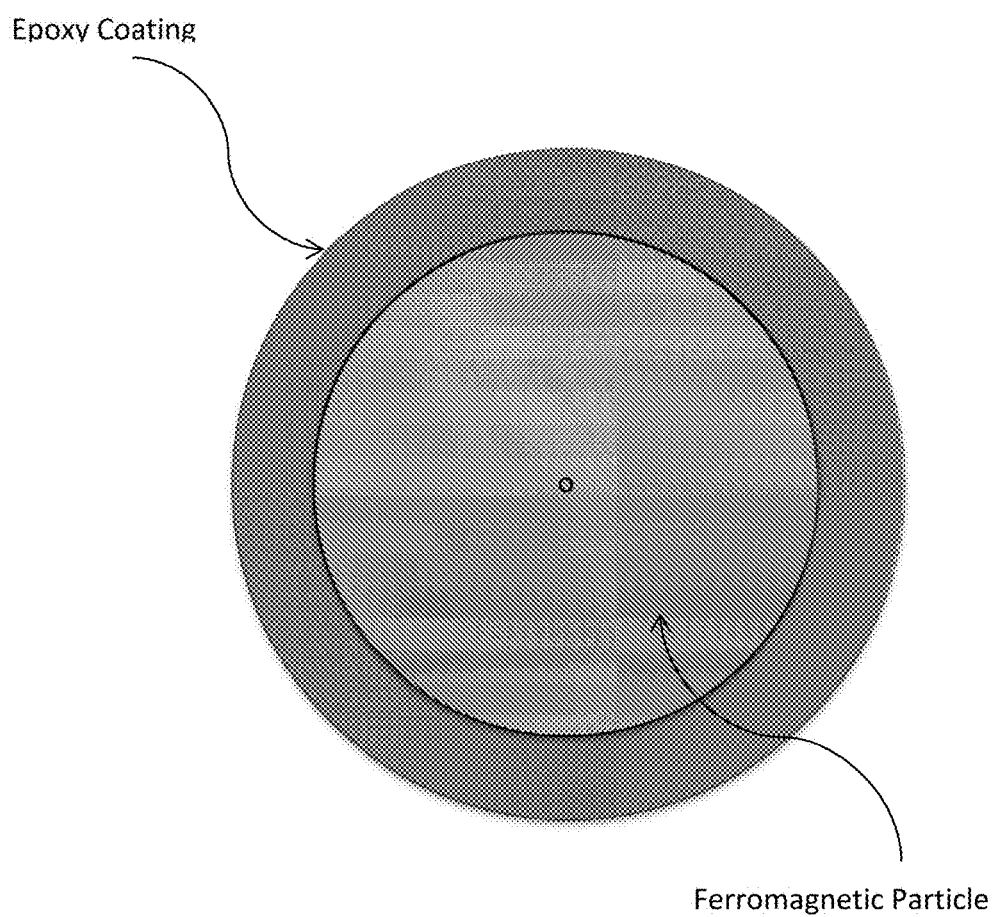
FIG. 1H illustrates a cross-section of an epoxy coating on a ferromagnetic particle.

FIG. 1E (Design), FIG. 1G (Simulation), and FIG. 1E (Experiment) may be considered together for details of cured filament and influence of magnetic field. To demonstrate the ability to program ferromagnetic domains in elastomeric structures, a single continuous line was printed with an alternating magnetization profile (FIG. 1E) by switching the EM-induced fields, as illustrated by B field arrows, B on arrow, and B off arrow. Curing of elastomers can be accomplished by 1) heating (thermal curing), 2) UV irradiation (UV curing), and 3) chemical reaction. In general, any conventional curing techniques may be applicable. After curing, the elastomeric line segment transformed into the desired "m" shape (FIG. 1E) upon application of external magnetic fields (~200 mT) under ambient conditions. Thus, the ferromagnetic torques generated by the ferromagnetic particles in response to the applied field were demonstrated to be sufficient to overcome the material elasticity, as illustrated by virtually straight cured filament transformed into "m" shape in FIG. 1E, that creates a restoring torque upon deformation. The simulation results (FIG. 1F) for a single line segment were also in good agreement with the experimental results (FIG. 1G which shows the shape of the single line segment at 0 second and 0.1 second, including a scale of 10 mm). As such, in order to achieve a desired shape from an elastomeric structure under the external fields, simulation-based predictions can reliably be used as a design guideline for programming ferromagnetic domains.

An embodiment of the present invention further provides for the programming of complex 3D morphologies from 2D geometries. In particular, using methods of an embodiment of the present invention, single-layered structures ("initial shape") may be formed which, upon application of external magnetic fields, yield complex 3D geometries ("transformed shape"). According to an embodiment of the present invention, such shape transformation is accomplished within about 0.5 seconds. The transformed 3D geometries quickly revert to their original 2D shape upon removal of the external magnetic fields. Some non-limiting examples of such transformation are set forth in FIGS. 5A-R. In FIG. 5, the column at extreme left shows Design where the arrows indicate magnetic orientation. The next column shows simulation results. The next two columns show a scale of 10 mm and experimental results at start or 0 second and a shape of the structure at the indicated time (0.25 second to 0.50 second), the structure being subjected to magnetic field. Transformation within a second may be described as "quick". Because the shape changes are based on magnetic field interaction, there exists no time delay unlike other types of shape-programmable active materials based on heating (shape memory polymers or liquid crystal elastomers) or swelling (hydrogels). However, the exact time required for shape transformation may not be very critical when it comes to general applications.

The first two examples illustrate the effects of programmed domains on the macroscale response towards the same external fields. In particular, the two annular rings presented in FIGS. 5C and 5F, are identical except that they are encoded with different ferromagnetic domains as depicted in FIGS. 5A and 5D, respectively. The second ring (FIG. 5F) is encoded with alternating patterns that vary in magnitude (as depicted by the size of the magnetized section) and, thus, demonstrates a more complex undulating shape (FIG. 5E) upon distortion compared to the first ring (FIG. 5C) whose alternating patterns are of about equal size (as depicted in FIG. 5A).

When applied to a more intricate pattern (e.g., FIG. 5G), even the simple alternating ferromagnetic domains result in a complex shape (FIG. SI). This complex transformed shape is such that it may become difficult to trace the original shape without first knowing the programmed domain patterns.

An embodiment of the present invention further provides for the formation of complex pop-up structures, such as those depicted in FIGS. 5K-L and 5N-O. Such transformed structures develop based on a folding motion under the applied external magnetic fields. As depicted in the programmed ferromagnetic domains for these structures (FIGS. 5J and 5M) in order to provide the pop-up structures, magnetically inactive segments are disposed within the structure. These inactive segments are portions marked with no arrows. According to embodiments of the present invention, inactive segments may be provided by programming printing pathways in a way that neutralizes the polarity to cancel out the net magnetic dipole moment. For example, one layer of sheet is printed by arranging printed fibers in parallel while applying a certain direction of an external magnetic field during the printing. Then, the magnetic particles will be aligned in the same direction in each fiber and across the entire sheet. A second layer can be printed on top of the previous layer by stacking the printed fibers. This time, the applied field direction is reversed to give the opposite magnetic polarity in the printed fibers. If the two printed layers are identical except the direction of the aligned magnetic particles, this double layer as a whole will have no clear directionality in terms of its magnetic moment because the magnetic moments of the upper and the lower layers are canceled out, leaving a neutral polarity. Or one can simply turn off the applied field to make the particles randomly oriented within the printed fiber, which will give no clear directionality in terms of the magnetic polarity.

FIGS. 5P-R illustrate a complicated shape-morphing structure, commonly referred to as a Miura-ori pattern, formed according to an embodiment of the present invention. Fully reversible and fast formation (i.e., formation within 1 second, as well as a similarly fast reversal) of a Miura-ori pattern has not previously been achievable using current materials and techniques. For example, time consuming thermal conduction (heating) and mass diffusion (swelling) techniques and materials are incapable of reversible and fast (response time within 1 second) folding of the Miura-ori structure. However, using the present ferromagnetic 3D printing method, combined with the high responsiveness of the present materials to external magnetic fields and the highly precise ferromagnetic domain programming capability, fully reversible and fast-transforming Miura-ori structure are successfully formed (see FIG. 5R).

The embodiments of the present methods of programming shapes by designing specific ferromagnetic domains can be further extended to complex 3D structures by taking advantage of the described fabrication platform based on direct ink writing. Typically, when printing 3D structures with direct ink writing, difficulties may arise due to the increasing structural instability as deposited filaments are stacked up in a layer-wise manner. In order to overcome this, an embodiment of the present invention introduces a printable support ink into the printed structure. The printable support may be composed, for example, of a silicone resin containing silicone catalyst and fumed silica nanoparticles.

Support ink should satisfy the following requirements:
1. Being non-curable, so as to be cleared away after curing (e.g. by rinsing off).
2. Possessing appropriate rheological properties such as shear thinning and shear yield stress to be printable and provide support during printing process.
3. No adverse effect on the curing of magnetic inks (it should not inhibit the curing of inks).

The general composition for support ink is i) elastomer resin without crosslinker + ii) curing regents such as catalysis + iii) rheology modifying fillers, when it comes to elastomer-based magnetic ink. In particular, according to an embodiment of the present invention, the support ink contains a much higher concentration of catalyst than the ferromagnetic composite ink to prevent diffusion of the catalyst molecules out of the deposited magnetic inks through the interface. When printed, the support ink serves as a fugitive support because it contains no crosslinker. As such, the supporting ink structure may be subsequently removed, such as by solvent rinsing, after the elastomer-ferromagnetic inks are fully cured (see FIGS. 6A-C; FIG. 6B and FIG. 6C described in more detail below). This 3D fabrication method and the creation of multilayer structures (which form the "initial shape") with programmed ferromagnetic domains allows for the formation of reconfigurable 3D structures exhibiting complex shape change under the application of external magnetic fields.

Figure 6A:
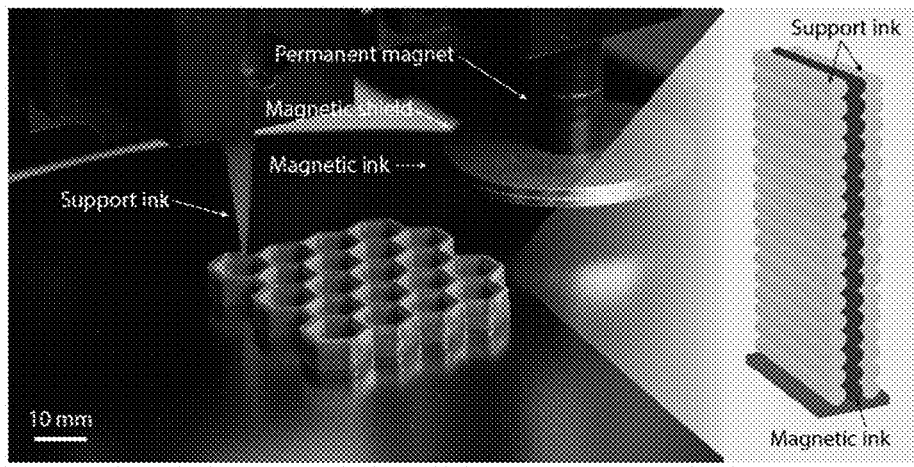
FIGS. 6A-C illustrate use of a support ink to provide stability when 3D printing layered filaments, where the support ink is removed by solvent rinses after the ferromagnetic inks are fully cured, according to an embodiment of the present invention.
Figure 6B:
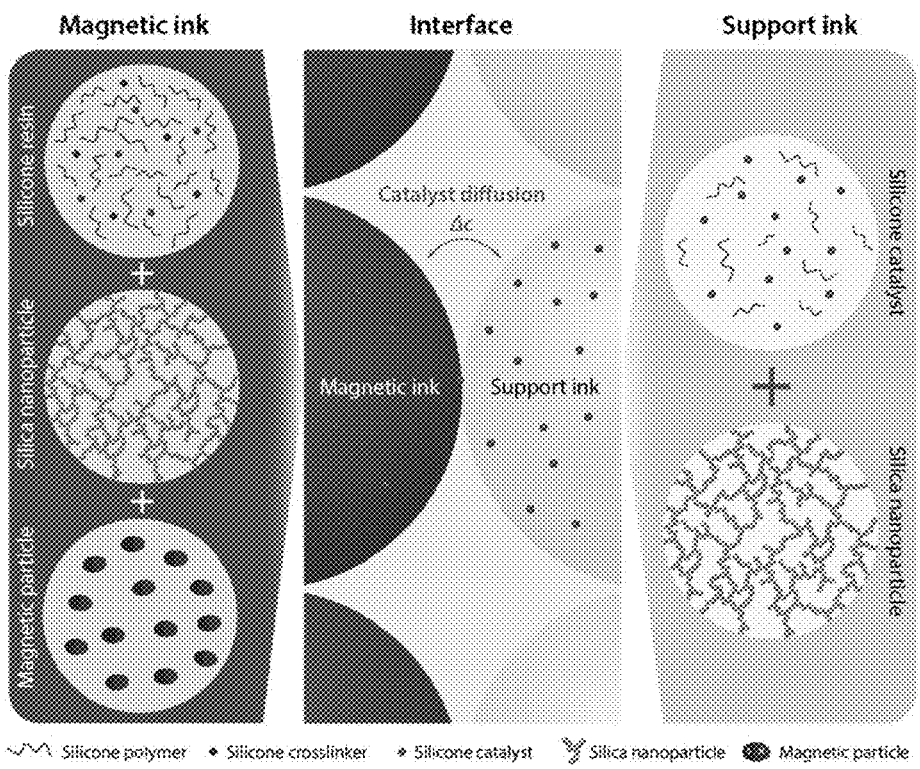
Figure 6C:
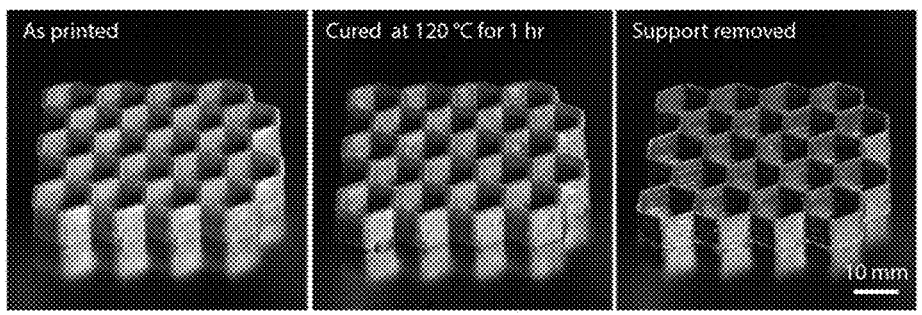

FIG. 6A depicts a permanent magnet, magnetic shield, a region for release of magnetic ink, and support ink being applied on a structure. On the right of FIG. 6A, an exemplary enlargement is shown to more clearly illustrate a concept of the support ink applied on two surfaces of magnetic ink. FIG. 6A shows an illustration of a process of deposition, such as 3D printing. The support ink is being deposited on a surface of magnetic material. Further, magnetic ink is typically released below the magnetic shield as shown in more detail in FIG. 1A.

In FIG. 6B, for "Interface" in the middle: $\Delta c$ indicates a concentration difference. A certain concentration match may be preferable. The magnetic ink (shown on the left) may include magnetic particle, silica nanoparticle, and silicone resin. A catalyst may be used to facilitate curing. A support ink, shown on the right, which may include silicone catalyst and silica nanoparticle, may be used for stability. The support ink generally does not include silicone resin as can be seen in FIG. 6B at the right. The catalyst can diffuse out.

In FIG. 6C, a difference between the middle figure and the right figure is that the walls on the right are less bright because the support ink is removed. At the left of FIG. 6C is shown an as-printed structure. Here, it may be noted that a "white wall" of support ink encloses the "dark" magnetic ink in FIG. 6A at the top right.

FIG. 7 shows concepts or details similar to those shown in FIG. 5, except that FIG. 7 shows structures that are more complex. Similar to FIG. 5, FIG. 7 shows examples of Design, Simulation, and Experiment. The images in Experiment part show the exemplary shapes at 0 second as well as the indicated time of 0.15 second to 0.50 second in presence of magnetic field, including a 10 mm scale.

As an illustrative example, a thin-walled structure was fabricated consisting of two adjoining hexagonal prisms that were encoded differently with alternating ferromagnetic domains (FIG. 7A). The prisms were divided in their design into multiple segments, some of which were programmed to elongate while the others were programmed to collapse under external magnetic fields. When combined, the result was undulating surfaces in a continuous 3D structure upon application of external fields (FIG. 7C).

As another example, a pyramid-shaped thin-walled structure was formed (FIG. 7D-F) which elongated along the direction of applied magnetic fields (FIG. 7F) due to the programmed ferromagnetic domains depicted in FIG. 7D.

An embodiment of the fabrication method of the present invention may further be used to create mechanical metamaterials (see FIGS. 7G, 7J, and 7M), so-called auxetic structures characterized by negative Poisson's ratio. Such structures exhibit compaction in response to applied magnetic fields. Typically, mechanical metamaterials show auxetic behaviors only when uniaxially compressed and, thus, require direct mechanical contact. As such, untethered actuation of auxetic structures has not been realized with programmable active materials to date. However, according to fabrication techniques and materials of an embodiment of the present invention, fast-transforming (response time within about 0.3 s) mechanical metamaterials have been fabricated, such as those depicted in FIGS. 7G-O. Application of external magnetic fields to these structures provides auxetic behaviors of those mechanical metamaterials without any direct mechanical contact.

The shape-morphing structures, of an embodiment of the present invention, depicted in FIGS. 5A-R and 7A-O, which describe the process of actuation of the structures under the influence of the power densities specified hereafter, deformed up to a strain level ranging from 0.15 to 0.25 within 0.5 second, providing power densities from 10.4 to 101.5 kW/m$^3$, where the power densities were orders of magnitude greater than that achieved by conventional programmable soft materials based on 3D printing.

The thus formed responsive materials find particular use in biomedical applications. In particular, most biological systems are magnetically transparent. As such, magnetic fields offer a safe and effective manipulation platform for biomedical applications which typically require untethered actuation in enclosed and confined spaces. Another advantage is that magnetic fields and their spatial gradients can be generated independently, which allows decoupling the resulting magnetic torques and forces into two different types of actuation. Furthermore, the use of magnetic fields as an actuation platform may be used in clinical applications such as targeted drug delivery or adaptive medical implants. In addition, by generating a continuous nonuniform magnetization profile in a polymeric sheet in accordance with an embodiment of the present invention, desired predetermined complex shapes may be achieved upon application of external magnetic fields. This is accomplished by encoding with complex programmed shapes in the present responsive materials. Harnessing the magnetic torques generated by the embedded particles in response to the external fields, these present responsive materials may undergo crawling and swimming motion based on simple bending or undulating deformation of the responsive material.

Figure 8:
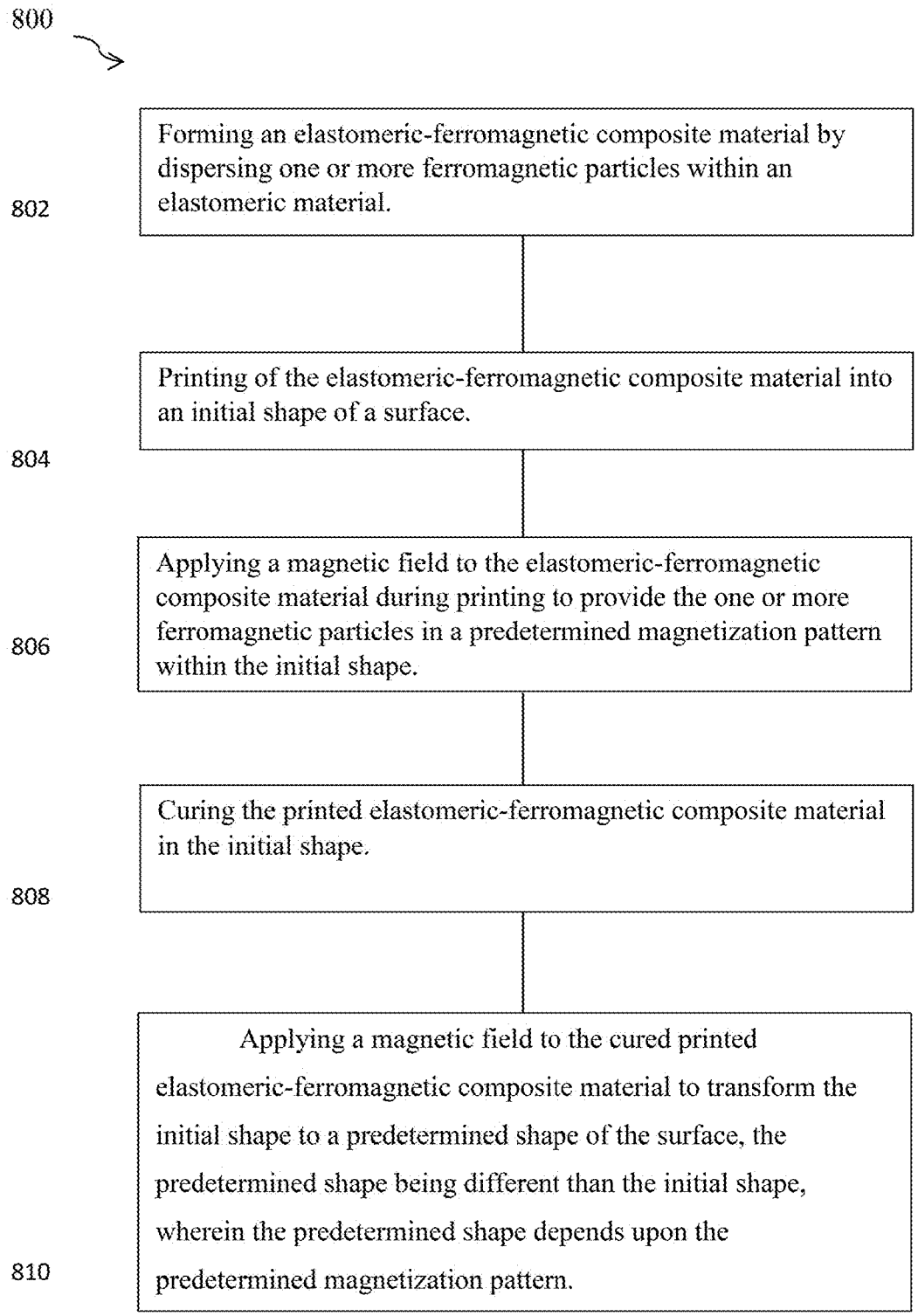
FIG. 8 describes an embodiment of a method of the present invention.

FIG. 8 shows an embodiment of a method 800 of the present invention. The method 800 is of transforming a surface. The method may include forming an elastomeric-ferromagnetic composite material by dispersing one or more ferromagnetic particles within an elastomeric material (block 802), printing of the elastomeric-ferromagnetic composite material into an initial shape of a surface (block 804), applying a magnetic field to the elastomeric-ferromagnetic composite material during printing to provide the one or more ferromagnetic particles in a predetermined magnetization pattern within the initial shape (block 806), curing the printed elastomeric-ferromagnetic composite material in the initial shape (block 808), and applying a magnetic field to the cured printed elastomeric-ferromagnetic composite material to transform the initial shape to a predetermined shape of the surface, the predetermined shape being different than the initial shape, wherein the predetermined shape depends upon the predetermined magnetization pattern (block 810).

In the method 800, the printing may further include direct ink printing and ferromagnetic 3D printing. In the method 800, the printing may further include a field-induced aligning of the one or more ferromagnetic particles.

In the method 800, the applying of the magnetic field may further include applying at least one of the magnetic field of an electromagnet and the magnetic field of a permanent magnet. In the method 800, the applying of the magnetic field may further include generating a torque on the one or more ferromagnetic particles.

In the method 800, the printing may further include magnetic shielding a portion of a deposited ink.

The method 800 may further include programming a ferromagnetic domain in the elastomeric-ferromagnetic composite material by selecting one or more magnetization profiles.

In the method 800, the printing may further include applying a support ink to the surface. The applying the support ink may further include removing the support ink after curing the printed surface.

The ferromagnetic 3D printing method, of an embodiment of the present invention, may further be extended to multiple composite ink designs using different types of elastomeric matrices and magnetic particles depending on the required materials properties and the actuation field strength. The capability to print ferromagnetic domains in soft matter leads to complex shape-shifting structures that exhibit fast, reversible, and dynamic response to applied magnetic fields. The untethered actuation of such complex and fast shape-shifting structures based on magnetic fields provides new possibilities for applications in biomedical devices, tissue engineering, and soft robotics.

It should also be noted that other techniques could be used, which would provide desired magnetization pattern, such as, but not limited to, stereolithography.

In view of the foregoing, it is intended that the embodiments of the present invention cover modifications and variations of this invention provided they fall within the scope of the following claims and their equivalents.

What is claimed is:
1. A transformable material comprising:
an elastomeric material;
ferromagnetic particles dispersed within the elastomeric material to provide an elastomeric-ferromagnetic composite material;
the elastomeric-ferromagnetic composite material having an initial shape; and the ferromagnetic particles being provided within the initial shape in a predetermined magnetization pattern;

wherein the transformable material changes shape from the initial shape into a predetermined transformed shape different than the initial shape upon application of a magnetic field, and wherein the predetermined transformed shape depends upon the predetermined magnetization pattern.

2. The transformable material of claim 1, wherein the elastomeric-ferromagnetic composite material is a printable ink.

3. The transformable material of claim 1, wherein the elastomeric-ferromagnetic composite material is an elastomeric matrix material including a ferromagnetic material and one or more of a filler, a catalyst, and a crosslinker.

4. The transformable material of claim 1, wherein the elastomeric material includes Silicone (Polydimethylsiloxane) rubber, Polyurethane (PU) rubber, Styrene Ethylene Butylene Styrene (SEBS) rubber, Polyacrylate rubber, and Polycaprolactone (PCL).

5. The transformable material of claim 1, wherein the elastomeric material has a glass transition temperature lower than an operating temperature.

6. The transformable material of claim 1, wherein the elastomeric material has a Young's modulus below 10 MPa.

7. The transformable material of claim 1, wherein the elastomeric material is a hydrogel.

8. The transformable material of claim 7, wherein the hydrogel includes one or more of alginate, pectin, and polyvinyl alcohol (PVA).

9. The transformable material of claim 1, wherein the ferromagnetic particles include an epoxy coating.

10. The transformable material of claim 1, wherein the ferromagnetic particles are corrosion-resistant.

11. The transformable material of claim 1, wherein the ferromagnetic particles include iron, cobalt, nickel, an alloy of one or more of iron, cobalt, and nickel, Neodymium-Iron-Boron (NdFeB), Samarium-Cobalt (SmCo), Aluminum-Nickel-Cobalt (AlNiCo), Barium-Iron Oxide (BaFeO), and Iron Oxide (FeO).

12. The transformable material of claim 1, wherein the elastomeric material includes a rheological modifier, the rheological modifier being one or more of fumed silica nanoparticles, graphene, nanoclay, and cellulose nanofibrils.

* * * * *